(12) United States Patent
Kumar et al.

(10) Patent No.: US 8,274,509 B2
(45) Date of Patent: *Sep. 25, 2012

(54) SYSTEM AND METHOD FOR COMPONENT SCATTERING

(75) Inventors: Ashwani Kumar, Pune (IN); Adrian Fraser, Cambridge (GB); Philip O. Williams, Huntsville, AL (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1069 days.

This patent is subject to a terminal disclaimer.

(21) Appl. No.: 12/172,530

(22) Filed: Jul. 14, 2008

(65) Prior Publication Data

US 2010/0007676 A1     Jan. 14, 2010

(51) Int. Cl.
*G06T 17/00* (2006.01)

(52) U.S. Cl. ........ 345/420; 345/418; 345/419; 345/619; 345/642

(58) Field of Classification Search .................. None
See application file for complete search history.

(56) References Cited

U.S. PATENT DOCUMENTS

| 5,428,726 | A | 6/1995 | Piegl et al. |
| 5,444,836 | A | 8/1995 | Hollingsworth |
| 5,803,629 | A | 9/1998 | Fox |
| 6,323,879 | B1 | 11/2001 | Sauerbrei |
| 6,844,877 | B1 | 1/2005 | Rajkumar et al. |
| 2006/0221022 | A1 | 10/2006 | Hajjar |
| 2008/0291200 | A1* | 11/2008 | Fraser et al. .................. 345/420 |
| 2008/0297504 | A1* | 12/2008 | Fraser et al. .................. 345/420 |

FOREIGN PATENT DOCUMENTS

EP     1612698 A1     1/2006

OTHER PUBLICATIONS

Jian Chen, et al., :"Effectiveness of Cloning Techniques for Architectural Virtual Environments" Virtual Reality, 2006, IEEE, Alexandria, VA USA Mar. 25-29, 2006, Piscataway, NJ.

* cited by examiner

*Primary Examiner* — Kee M Tung
*Assistant Examiner* — Jwalant Amin (57) ABSTRACT

A system, method, and computer program for component scattering, comprising calculating a bounding box for each of a plurality of parts; calculating a centroid corresponding to each of said bounding boxes; placing a first part having a bounding box and a centroid at said start position, and; placing said plurality of parts in a pre-determined direction from said first part; whereby in a single operation said plurality of parts are logically added to an assembly view in a pre-determined manner, and appropriate means and computer-readable instructions.

9 Claims, 7 Drawing Sheets

SYSTEM AND METHOD FOR COMPONENT SCATTERING

CROSS-REFERENCE TO RELATED APPLICATIONS

This application is related to U.S. Ser. No. 12/051,029, entitled "SYSTEM AND METHOD FOR RADIAL COMPONENT SCATTERING" and U.S. Ser. No. 12/051,039, entitled "SYSTEM AND METHOD COMPONENT SCATTERING FROM A LIST", both filed on Mar. 19, 2008.

TECHNICAL FIELD

The presently preferred embodiment of the innovations described herein relate generally to software applications. More specifically, the presently preferred embodiment relates to scattering components into a modeling assembly.

BACKGROUND

Common in the industry of computer aided drafting is the need for a user, or drafter, or designer, to place multiple objects close to a center. The placement of the multiple objects aides the designer when combining parts and subparts to form a larger assembly comprised of multiple components. The modeling of any assembly involves specifying all of its constituent parts and then adding them into the assembly. Traditionally, this process is typically done by specifying one part at a time and positioning the part into the assembly. The positioning can be time consuming and inefficient when a large number of parts are involved or if there are many instances of the same part that are members of the assembly. Alternatively, the addition of multiple parts may result in overlapping placement or illogical placement that could occur anywhere within the limits of the 3D modeling environment. Additionally, it is important that these parts don't overlap each other in the assembly space.

It is desirable to improve user experience and efficiency with logical and intuitive placement of parts in an assembly; adding multiple parts to the assembly in a single operation with efficiency and less effort can significantly reduce the time to model the assembly. What is needed is a system and method for adding multiple parts in an assembly in a single operation that overcomes the limitations of the known methods discussed above.

SUMMARY

To achieve the foregoing, and in accordance with the purpose of the presently preferred embodiment as described herein, the present application provides a computer implemented method for component scattering, comprising calculating a bounding box for each of a plurality of parts; calculating a centroid corresponding to each of said bounding boxes; placing a first part having a bounding box and a centroid at said start position, and; placing said plurality of parts in a pre-determined direction from said first part; whereby in a single operation said plurality of parts are logically added to an assembly view in a pre-determined manner. The method, wherein said placing occurs by placing said plurality of parts in a square matrix on a work view plane. The method, wherein said plurality of parts is spaced apart by a distance corresponding to a largest bounding box. The method, wherein said distance is 1.2 times of said part having said largest bounding box.

An advantage of the presently preferred embodiment is to provide a computer-program product tangibly embodied in a machine readable medium to perform a method for component scattering, comprising instructions operable to cause a computer to calculate a bounding box for each of a plurality of parts; calculate a centroid corresponding to each of said bounding boxes; place a first part having a bounding box and a centroid at said start position, and; place said plurality of parts in a pre-determined direction from said first part; whereby in a single operation said plurality of parts are logically added to an assembly view in a pre-determined manner. The computer-program product, wherein said placing occurs by placing said plurality of parts in a square matrix on a work view plane. The computer-program product, wherein said plurality of parts is spaced apart by a distance corresponding to a largest bounding box. The computer-program product, wherein said distance is 1.2 times of said part having said largest bounding box.

Another advantage of the presently preferred embodiment is to provide a data processing system having at least a processor and accessible memory to implement a method for component scattering, comprising means for calculating a bounding box for each of a plurality of parts; means for calculating a centroid corresponding to each of said bounding boxes; means for placing a first part having a bounding box and a centroid at said start position, and; means for placing said plurality of parts in a pre-determined direction from said first part.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Computer System

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for component scattering. Now therefore, in accordance with the presently preferred embodiment, an operating system executes on a computer, such as a general-purpose personal computer.

Figure 5:
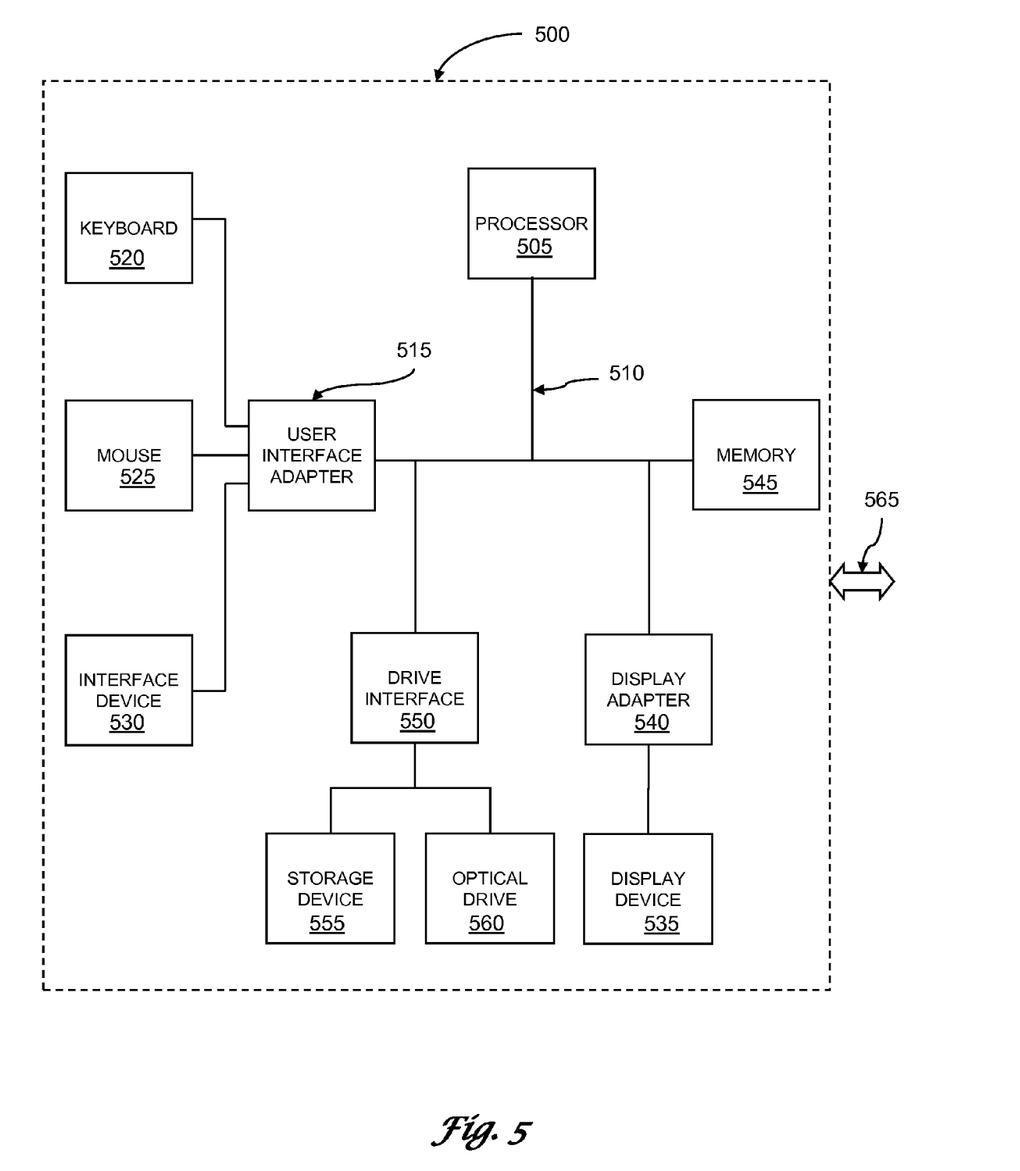
FIG. 5 is a block diagram of a computer environment in which the presently preferred embodiment may be practiced.

FIG. 5 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 5, an exemplary system for implementing the presently preferred embodiment includes a general-purpose computing device in the form of a computer 500, such as a desktop or laptop computer, including a plurality of related peripheral devices (not depicted). The computer 500 includes a microprocessor 505 and a bus 510 employed to connect and enable communication between the microprocessor 505 and a plurality of components of the computer 500 in accordance with known techniques. The bus 510 may be any of several types of bus structures including a memory bus or memory controller, a peripheral bus, and a local bus using any of a variety of bus architectures. The computer 500 typically includes a user interface adapter 515, which connects the microprocessor 505 via the bus 510 to one or more interface devices, such as a keyboard 520, mouse 525, and/or other interface devices 530, which can be any user interface device, such as a touch sensitive screen, digitized pen entry pad, etc. The bus 510 also connects a display device 535, such as an LCD screen or monitor, to the microprocessor 505 via a display adapter 540. The bus 510 also connects the microprocessor 505 to a memory 545, which can include ROM, RAM, etc.

The computer 500 further includes a drive interface 550 that couples at least one storage device 555 and/or at least one optical drive 560 to the bus. The storage device 555 can include a hard disk drive, not shown, for reading and writing to a disk, a magnetic disk drive, not shown, for reading from or writing to a removable magnetic disk drive. Likewise the optical drive 560 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 500.

The computer 500 can communicate via a communications channel 565 with other computers or networks of computers. The computer 500 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 545 of the computer 500. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System for Component Scattering

Figure 1:
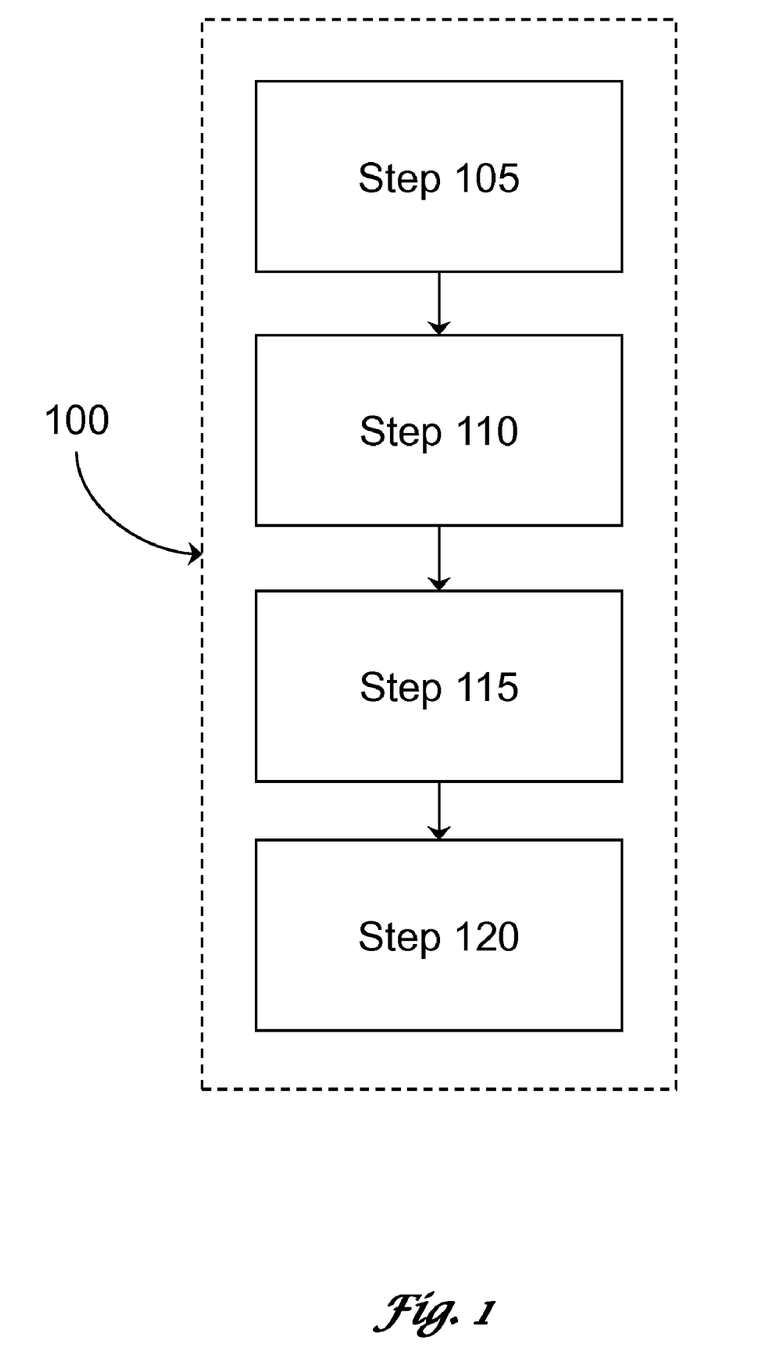
FIG. 1 is a logic flow diagram of the method employed by the presently preferred embodiment.

FIG. 1 is a logic flow diagram of the method employed by the presently preferred embodiment. Referring to FIG. 1, a computer implemented method 100 determines component scatter. A bounding box for each of a number of parts is calculated (Step 105). A centroid for each of the bounding boxes is calculated (Step 110). A first part is placed at a start position (Step 115). The numbers of parts are logically placed in a pre-determined and intuitive manner from the first part (Step 120). The methods of component scattering in accordance with the presently preferred embodiment are set forth in more detail below.

Step 1

Figure 2:
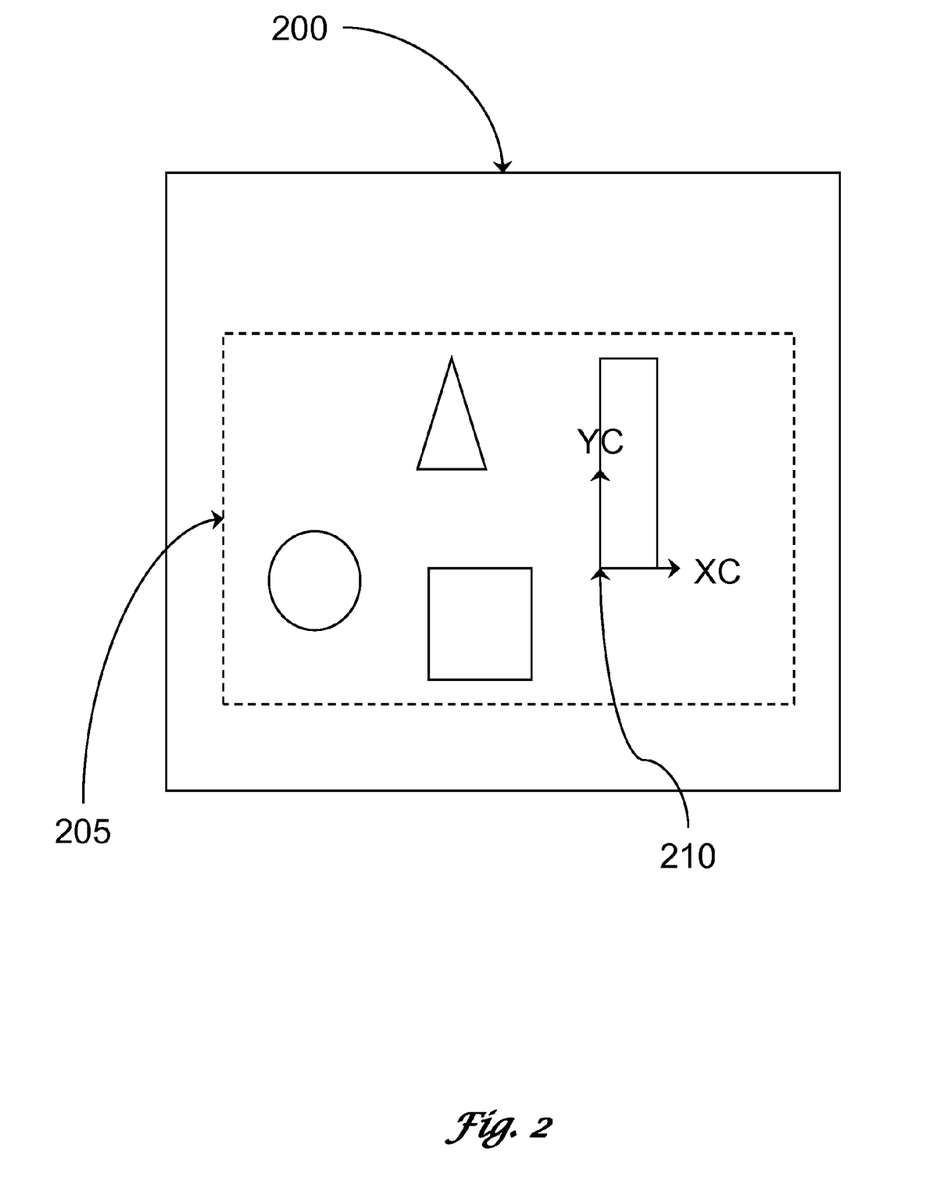
FIG. 2 is an illustration of a windowed environment.

FIG. 2 is an illustration of a windowed environment. Referring to FIG. 2, a user places in a windowed environment 200 a number of geometric objects 205 by known means such as creating the geometric objects 205 or loading the geometric objects 205 from an already existing source. The user can select and set an orientation of the geometric objects 205 to a positive axis 210. The positive axis 210, orients and positions the geometric objects 205 on a XC-YC plane in this illustration, where the "C" refers to Component, but the user could have selected the orientation along the x-z plane or the y-z plane. Likewise, the user could have selected to orient the geometric objects 205 to an absolute X-Y axis.

Step 2

Figure 3A:
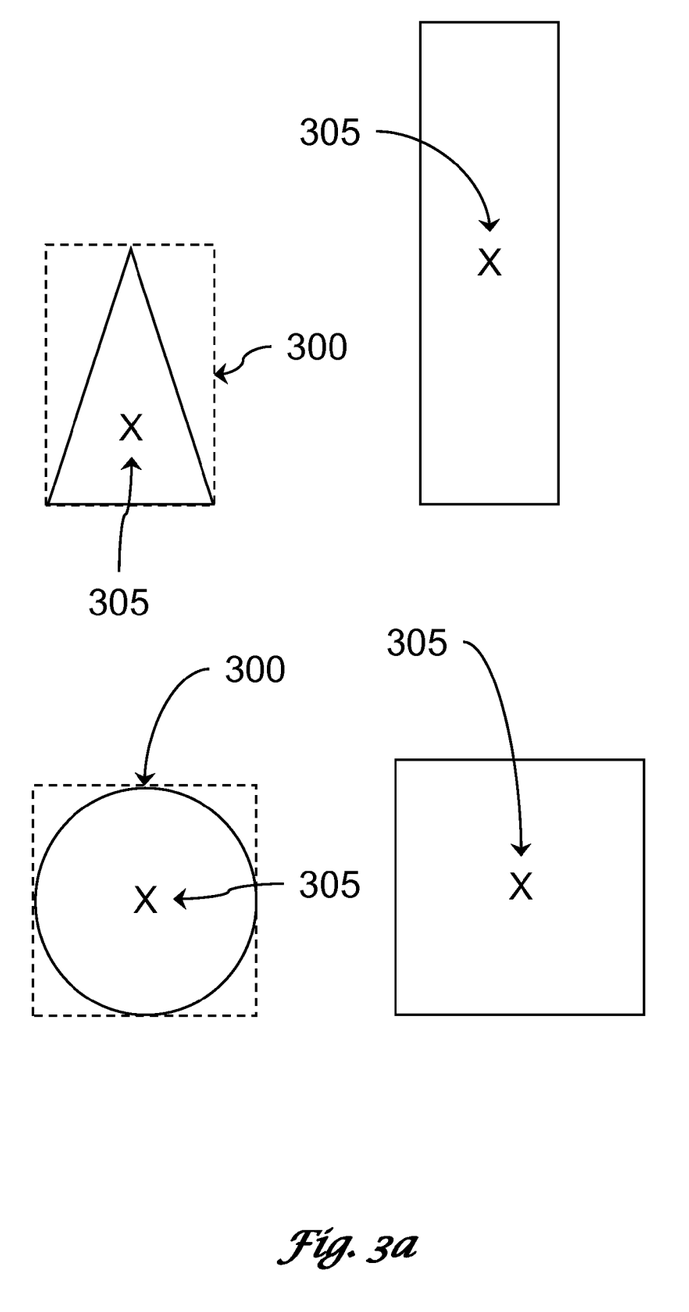
FIG. 3 is an illustration of a geometric object with a bounding box.
Figure 3B:
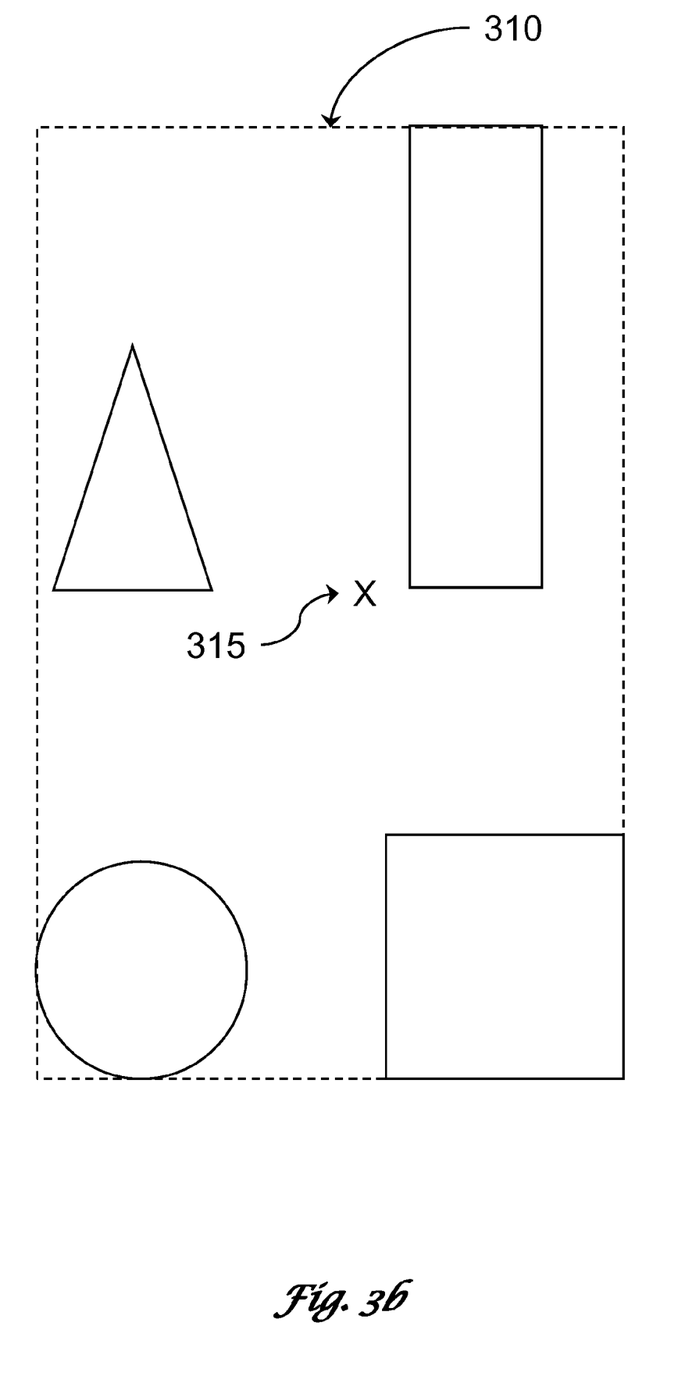

FIGS. 3a and 3b illustrate a geometric object with a bounding box. Referring to FIG. 3a, a bounding box 300 is calculated for the individual geometric objects 205, respectively. Once the bounding box is calculated (Step 105), a centroid 305, shown by the "X" in FIG. 3a, is also determined (Step 110) where the centroid 305 is the weighted center of the geometric object. Both Steps 105 & 110 are calculated using common methods known in the industry, or by using CAD applications such as NX® sold by Siemens Product Lifecycle Management Software, Inc., and will not be discussed further. It is understood that the geometric objects 205 can have a common bounding box 310, and a common centroid 315, both of which are illustrated in FIG. 3b.

Step 3

Figure 4A:
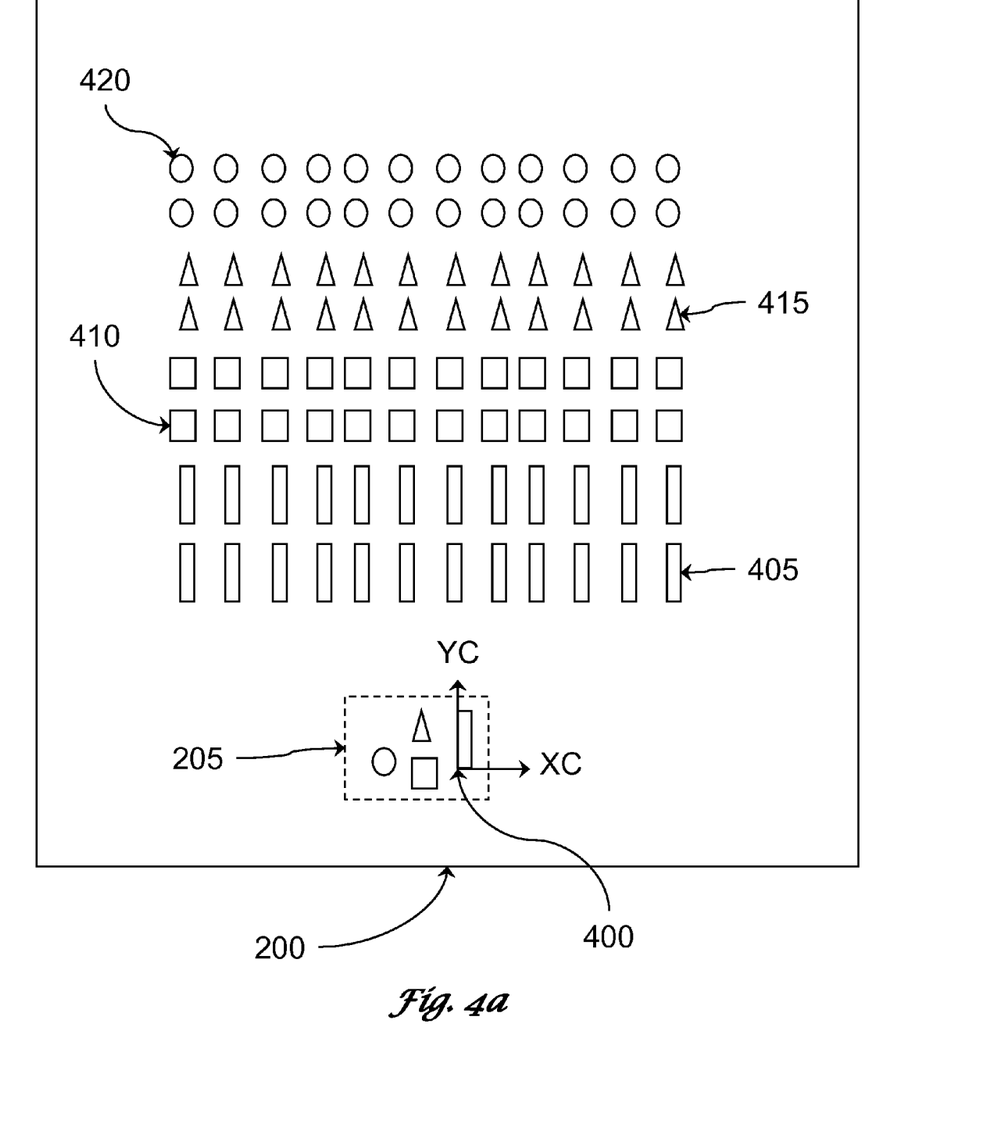
FIGS. 4*a* and 4*b* illustrate a windowed environment displaying a plurality of parts.
Figure 4B:
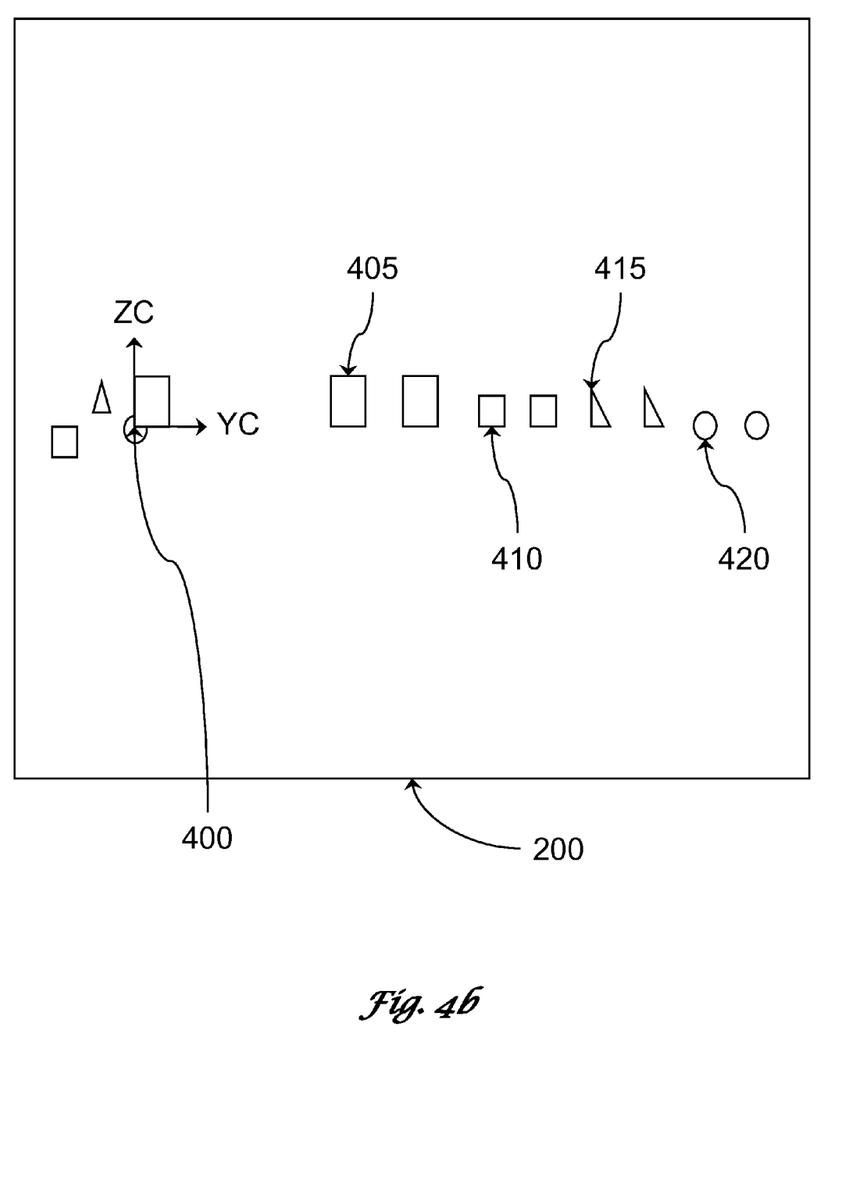

The user intends to add components, i.e., place identical instances of the geometric objects 205, into the windowed environment 200 to create an assembly. FIGS. 4a and 4b illustrate a windowed environment displaying a plurality of parts. Referring to FIG. 4a, the user selects all of the geometric objects 205 for a first part. In determining a start position point 400 of the reference object, the user selects the positive axis 210 that is oriented on a component in the geometric objects 205 (Step 115). Alternatively, the user could have selected a relative axis of the windowed environment 200 or any other point when determining the start position. For the example illustrated in FIG. 4, the user intends to add instances of the selected four geometric objects 205. Once the user has executed an "Add Components" command that provides a location to input the quantity of instances the user would like to add. For example, 24 instances of the selected geometric objects 205 are added to the windowed environment 200, arranged according to the centroid 305 referenced in each geometric object 205, as shown. One of the important points is the sequential placement of identical instances of the geometric objects 205. Another key element is the geometric object with the greatest bounding box, or other calculated volume and/or mass, is placed closest to the start position 400. In the illustration, the cube with dihedral symmetry in 3D would appear as a rectangle 405 in two dimensions is determined to have the largest volume and is placed closest to the starting point 400. In decreasing volume is as a square 410, a triangle 415, and then a circle 420, which are the 2D representations of a cube, a polyhedron with a triangle base, and a sphere, respectively.

Shifting views along another plane as illustrated in FIG. 4b, will highlight the placement of the numerous instances of the geometric objects 205. Notable, is the bases of the rectangle 405, square 410, and triangle 415 objects are placed along the same path or otherwise invisible ray from the start point 400. For the circle 420, the center is placed along that same path.
Step 4

The placement of part is accomplished by placing all the instances of selected parts in a square matrix on a work view plane (Step 120). For example, if there are 100 parts selected to add, those parts would be scattered on a plane with 10 rows, each row with 10 components. This ensures that the parts do not overlap with each other. A distance between two consecutive parts was kept to 1.2 times the part with largest bounding box. The plane on which components were scattered was determined based upon the work view plane, according to Table 1:

TABLE 1

| Work View Plane | Scatter View | $3^{rd}$ Coord Direction |
| --- | --- | --- |
| Top | XY | +z |
| Front | XZ | −y |
| Right | YZ | +x |
| Back | XZ | +y |
| Bottom | XY | −z |
| Left | YZ | −x |
| Iso | XY | +z |

Position of all the existing parts was determined to choose the scatter center. For example, to scatter parts in XY plane the z-coordinate position of scatter center was determined based upon what is the farthest placed part in positive z-direction. The scatter center's z-coordinate was set at offset of 1.2 times the largest bounding box of the parts to be placed from the farthest placed part in positive z-direction. Also whether the z coordinate of the scatter center is taken in positive z-direction or negative was based upon view plane.

Parts (components) are placed according to the methods provided herein by the presently preferred embodiment to intuitively provide placement of multiple instances of similar objects to improve modeling speed and experience because larger objects are placed close to the center of the display while smaller objects are placed further away

CONCLUSION

From Step 1 through Step 3, the presently preferred embodiment has disclosed complete solution for of component scattering. The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application 2-specific integrated circuits).

A number of embodiments have been described. It will be understood that various modifications may be made without departing from the spirit and scope of the presently preferred embodiment, such as drag and drop placement of multiple components so that there is no overlap and larger items are placed closer to the intended location. Therefore, other implementations are within the scope of the following claims.

What is claimed is:

1. A computer-implemented method for component scattering, comprising:
    calculating a bounding box for each of a plurality of parts by a computer;
    calculating, by the computer, a centroid corresponding to each of said bounding boxes;
    placing a first part having a bounding box and a centroid at a start position by the computer, and;
    placing, by the computer, said plurality of parts in a pre-determined direction from said first part,
    whereby in a single operation said plurality of parts are logically added to an assembly view in a pre-determined manner.

2. The method of claim 1, wherein said placing occurs by placing said plurality of parts in a square matrix on a work view plane.

3. The method of claim 1, wherein said plurality of parts is spaced apart by a distance corresponding to a largest bounding box.

4. The method of claim 3, wherein said distance is 1.2 times of said part having said largest bounding box.

5. A non-transitory computer-program product tangibly embodied in a machine readable medium to perform a method for component scattering, comprising instructions operable to cause a computer to:
    calculate a bounding box for each of a plurality of parts;
    calculate a centroid corresponding to each of said bounding boxes;
    place a first part having a bounding box and a centroid at a start position; and
    place said plurality of parts in a pre-determined direction from said first part, whereby in a single operation said plurality of parts are logically added to an assembly view in a pre-determined manner.

6. The computer-program product of claim 5, wherein said placing occurs by placing said plurality of parts in a square matrix on a work view plane.

7. The computer-program product of claim 5, wherein said plurality of parts is spaced apart by a distance corresponding to a largest bounding box.

8. The computer-program product of claim 7, wherein said distance is 1.2 times of said part having said largest bounding box.

9. A data processing system comprising:
a processor; and
an accessible memory, the data processing system configured to implement a method for component scattering by:
calculating a bounding box for each of a plurality of parts;
calculating a centroid corresponding to each of said bounding boxes;
placing a first part having a bounding box and a centroid at a start position; and
placing said plurality of parts in a pre-determined direction from said first part.

* * * * *